United States Patent
Salpe et al.

(10) Patent No.: US 10,050,919 B2
(45) Date of Patent: Aug. 14, 2018

(54) HIGHLY PARALLEL SCALABLE DISTRIBUTED EMAIL THREADING ALGORITHM

(71) Applicant: Veritas Technologies LLC, Mountain View, CA (US)

(72) Inventors: Nilesh Salpe, Pune (IN); Vaijayanti Bharadwaj, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 282 days.

(21) Appl. No.: 14/803,766

(22) Filed: Jul. 20, 2015

(65) Prior Publication Data

US 2016/0380942 A1    Dec. 29, 2016

(30) Foreign Application Priority Data

Jun. 26, 2015 (IN) .......................... 3246/CHE/2015

(51) Int. Cl.
*G06F 17/30* (2006.01)
*H04L 12/58* (2006.01)

(52) U.S. Cl.
CPC .......... *H04L 51/16* (2013.01); *G06F 17/3033* (2013.01); *G06F 17/30386* (2013.01); *H04L 51/04* (2013.01)

(58) Field of Classification Search
CPC ................................................. G06F 17/3033
See application file for complete search history.

(56) References Cited

U.S. PATENT DOCUMENTS

| | | | | |
|---|---|---|---|---|
| 7,516,186 | B1 * | 4/2009 | Borghetti | G06Q 10/107 707/999.104 |
| 8,423,616 | B2 * | 4/2013 | Pouzin | G06Q 10/107 709/206 |
| 9,563,689 | B1 * | 2/2017 | Pueyo | G06F 17/30705 |
| 2003/0182310 | A1 * | 9/2003 | Charnock | G06F 17/30716 |
| 2006/0271547 | A1 * | 11/2006 | Chen | G06F 17/30215 |
| 2008/0301250 | A1 * | 12/2008 | Hardy | G06Q 10/107 709/207 |
| 2009/0106375 | A1 * | 4/2009 | Carmel | G06F 17/279 709/206 |

(Continued)

OTHER PUBLICATIONS

Erera, Shai, "Conversation Detection in Email Systems", University of Haifa, Nov. 2007, http://digitool.haifa.ac.il/exlibris/dtl/d3_1/apache_media/L2V4bGlicmlzL2R0bC9kM18xL2FwYWNoZV9tZWRpYS8yMjA1MTE=.pdf, 42 pages. [Retrieved Apr. 10, 2015].

(Continued)

*Primary Examiner* — Syed H Hasan
(74) *Attorney, Agent, or Firm* — Rory D. Rankin; Meyertons, Hood, Kivlin, Kowert & Goetzel, P.C.

(57) ABSTRACT

Systems, apparatuses, methods, and computer readable mediums for implementing a scalable distributed email threading algorithm. A database is created for storing a plurality of emails organized by subjects and relaxed checksums. Each node of a plurality of nodes retrieves a different subject for processing, and each node reconstructs an email discussion thread from a corresponding retrieved subject. A given node may merge incomplete threads which are related but which have different subjects. Then, the nodes may write the reconstructed threads back to the database.

20 Claims, 17 Drawing Sheets

(56) References Cited

U.S. PATENT DOCUMENTS

2010/0088377 A1* 4/2010 Johnson ............... G06Q 10/107
709/206
2014/0046945 A1* 2/2014 Deolalikar .......... G06F 17/3071
707/737

OTHER PUBLICATIONS

Zawinski, Jamie, "Message Threading", JWZ.org, 2002, 8 pages, http://www.jwz.org/doc/threading.html. [Retrieved Apr. 10, 2015].
Yeh et al., "Email Thread Reassembly Using Similarity Matching", CEAS 2006—Third Conference on Email and Anti-Spam, Jul. 27-28, 2006, 8 pages, Mountain View, CA, US.
Abdelrahman et al., "A New Email Retrieval Ranking Approach", International Journal of Computer Science & Information Technology, Oct. 2010, vol. 2, No. 5, pp. 44-63.
Erera, Shai, "Conversation Detection in Email Systems", University of Haifa, Nov. 2007, pages.
Wang et al., "Email Conversations Reconstruction Based on Messages Threading for Multi-person", 2008 International Workshop on Education Technology and Training & 2008 International Workshop on Geoscience and Remote Sensing, Dec. 21-22, 2008, pp. 676-680.

* cited by examiner

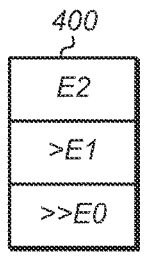

400

E2: Top Level Email

E1: Derived Email – Contained Email ()

E0: Derived Email – Contained Email (e.g., start of discussion)

Entire group of E2, E1, E0 is called Derived Email Group

405

From: Vaijayanti Bharadwaj
Sent: Tuesday, February 17, 2015 1:51 PM
To: Nilesh Salpe
Subject: RE: PPT Thx

 E2

From: Nilesh Salpe
Sent: Tuesday, February 17, 2015 1:50 PM
To: Vaijayanti Bharadwaj
Subject: RE: PPT Here is the PPT

 E1

From: Vaijayanti Bharadwaj
Sent: Tuesday, February 17, 2015 1:46 PM
To: Nilesh Salpe
Subject: RE: PPT Please send the ppt

 E0

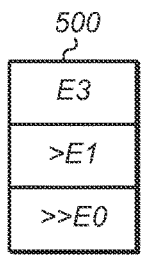

E3: Top Level Email

E1: Derived Email – Contained Email ()

E0: Derived Email – Contained Email (e.g., start of discussion)

Entire group of E3, E1, E0 is called Derived Email Group

505

From: Vaijayanti Bharadwaj
Sent: Tuesday, February 17, 2015 2:10 PM
To: Nilesh Salpe
Subject: RE: PPT Something missing from slide 4?

 E3

From: Nilesh Salpe
Sent: Tuesday, February 17, 2015 1:50 PM
To: Vaijayanti Bharadwaj
Subject: RE: PPT Here is the PPT

 E1

From: Vaijayanti Bharadwaj
Sent: Tuesday, February 17, 2015 1:46 PM
To: Nilesh Salpe
Subject: RE: PPT Please send the ppt

 E0

FIG. 5

Email Collection for the Case
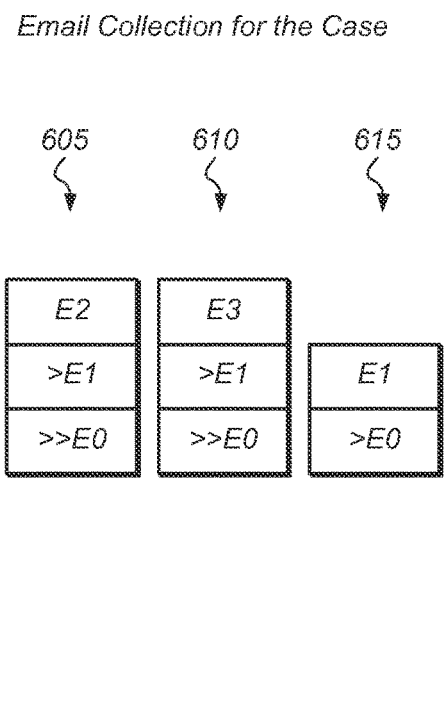
Expected Discussion Thread
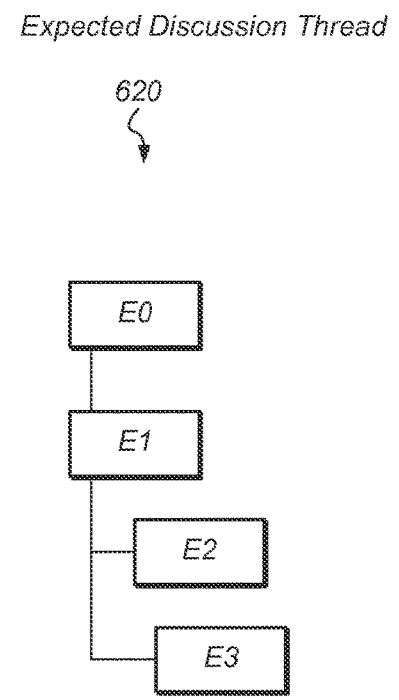
FIG. 6

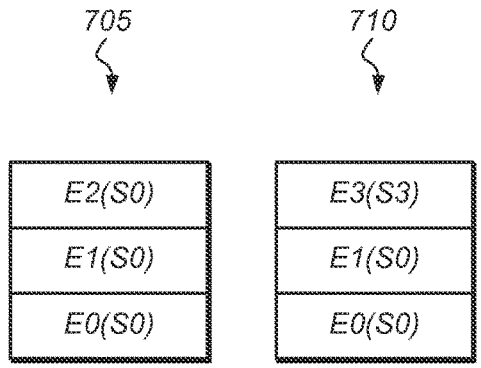
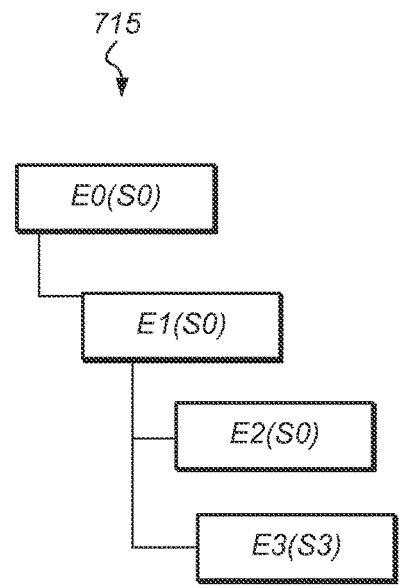
FIG. 7

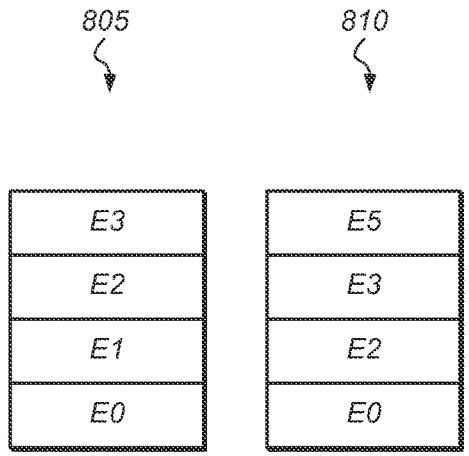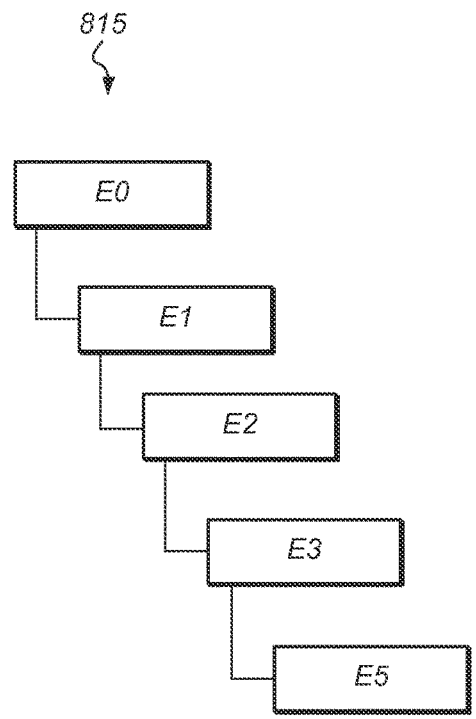
FIG. 8

1100

| From India | From Japan | From USA |
|---|---|---|
| E0<br>1 Jan 2015 10 AM<br>IST | E1 | E2 |
| | E0<br>1 Jan 1:30 PM<br>2015 JST | E0<br>31st Dec 11:30 PM<br>2014 PST |

*FIG. 11*

HIGHLY PARALLEL SCALABLE DISTRIBUTED EMAIL THREADING ALGORITHM

PRIORITY INFORMATION

This application claims benefit of priority to Indian Application No. 3246/CHE/2015, filed Jun. 26, 2015, entitled "HIGHLY PARALLEL SCALABLE DISTRIBUTED EMAIL THREADING ALGORITHM", which is hereby incorporated by reference in its entirety.

BACKGROUND

Technical Field

Embodiments described herein relate to information processing and more particularly, to reconstructing email threads.

Description of the Related Art

For data retention reasons, organizations tend to keep electronic messages (emails) around for a long time. Accordingly, the number of emails stored by an organization expands rapidly over time. Additionally, the amount of stored data also increases rapidly due to the redundant data in long email reply chains, which typically have the original emails included in each reply, causing the amount of data in each subsequent reply to increase as the reply chain grows. Often, many emails are part of a single email reply chain (or thread), with a thread including an original email and all replies to or forwards of the original email and replies/forwards to the replies/forwards. The terms "thread", "email thread", "discussion thread", and "email discussion thread" may be defined as a plurality of emails related to a single logical conversation. Similarly, the terms "reconstructing a thread", "thread reconstruction", and "email threading" may be defined as identifying a sequence of emails which are connected to, derived from, or associated with at least one common email and then rebuilding the sequence in chronological order.

Electronic discovery (or eDiscovery) is an important tool used by many organizations, and eDiscovery is often used to find a "smoking gun" email. The "smoking gun" email may be part of a long thread, and if such an email is found, it is important to reconstruct the thread the email appeared in. Accordingly, creating accurate email discussion threads is an important part of eDiscovery and other tools.

Email threading is used for various purposes to provide information to users with more context. Examples include eDiscovery, archiving, and data leakage protection. For example, an email may not be incriminating by itself, but considered as a thread it could be. One of the challenges with email threading is retaining the highly stringent requirements of accuracy of thread. For example, the requirements may include not just forming threads on the basis of subject alone, because the subject can change in a thread. Also, some emails in the thread may be missing from the archives. The information within emails can also be conflicting since sometimes prior content may be modified within a reply. Emails can also span a large time period.

In addition to the challenges described above, other issues exist when reconstructing email threads. Senders and receivers can get added in the thread as the discussion progresses. Also, emails may be sent using different types of email clients, and not all emails may have identifiable email headers. Additionally, emails may be sent and received in different time zones.

SUMMARY

Systems, apparatuses, and methods for efficiently creating, from an email corpus, email discussion threads with high accuracy by using a parallel scalable distributed algorithm.

In various embodiments, a system with a plurality of nodes may be configured to perform accurate email threading when confronted with any of a variety of challenges. These challenges may include header information not being present, the subject and/or participants changing, contained email changing due to users deleting content from long threads, massive numbers of emails being processed, and/or other challenges. The system may be configured to implement a parallel scalable distributed algorithm to create accurate discussion threads from large numbers of emails.

In one embodiment, the system may include a highly scalable database and a plurality of nodes. The system may be configured to utilize the highly scalable database for storing data retrieved from an email corpus and/or from an incremental batch of emails. In one embodiment, the database may be a NoSQL, shared-nothing, scalable key-value store capable of storing hierarchical keys and large values. Hierarchical keys can be composite and of the form $K1, K2, \ldots Kn$, wherein for a given $K1, K2, \ldots Km$ ($m<=n$), the database can retrieve the value. In one embodiment, the database may be configured to organize emails with the subject or subject hash of the email itself as a primary key and a relaxed hash (e.g., a relaxed checksum) of the email as a secondary key. Subjects may be identified within the email corpus and each node may pick up a subject to process. For ease of discussion, the term "hash" may generally be used herein to describe any of a variety of functions that may be used to produce an output value based on an input value. More particularly, such a function may generally be designed to produce a same output value whenever a given input value is processed. In addition, the function may be collision resistant in the sense that different inputs will produce different outputs in the vast majority of cases. Numerous hash functions are available and are contemplated, include MD5 (and variants), SHA1 (and variants), checksums, cyclic redundancy checks, and so on. The terms hash or checksum, as used herein, are contemplated as including any of these functions.

In one embodiment, emails may be organized in the NoSQL database in two ways: 1. For redundancy elimination, the primary key is the email's own subject hash and the secondary key is the email's relaxed checksum. 2. For threading, the primary key is the Top-Level-Email's subject hash and the secondary key is the sent date of the Top-Level-Email. This ensures one Derived Email Group (DEG) stays together, even when the subject changes.

In one embodiment, a given node may pick up a first subject for threading. The given node may retrieve all emails which have the first subject. The database may be organized in such a way that all of the emails of the first subject may be quickly retrieved without requiring a search. Then, the given node may load all of the emails of the first subject in the given node's memory. Next, the given node may deduplicate redundant emails from the loaded emails. Then, the given node may reconstruct the thread from the emails. If the given node determines that the thread is complete, processing may finish at this point, and the given node may store the reconstructed thread for the first subject in the database. If the given node determines that a given thread is incomplete, a search may be performed to find another incomplete thread on a different node which is related to the given thread, and then the given thread may be merged with the other incomplete thread. In one embodiment, the process of merging different threads may happen after all threads are formed. In some embodiments, subject changes may be rare, and so only a small fraction of threads will be marked as incomplete and merged.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 4 is a block diagram illustrating one embodiment of an example email collection and the corresponding email discussion.

FIG. 5 is a block diagram illustrating one embodiment of another example email collection and the corresponding email discussion.

FIG. 6 is a block diagram illustrating one example of an email collection and corresponding expected discussion thread.

FIG. 7 is a block diagram illustrating another example of an email collection and a corresponding email discussion thread.

FIG. 8 is a block diagram illustrating another example of an email collection and a corresponding email discussion thread.

FIG. 11 illustrates time zone skew when an email is replied to in another time zone.

DETAILED DESCRIPTION OF EMBODIMENTS

Figure 1:
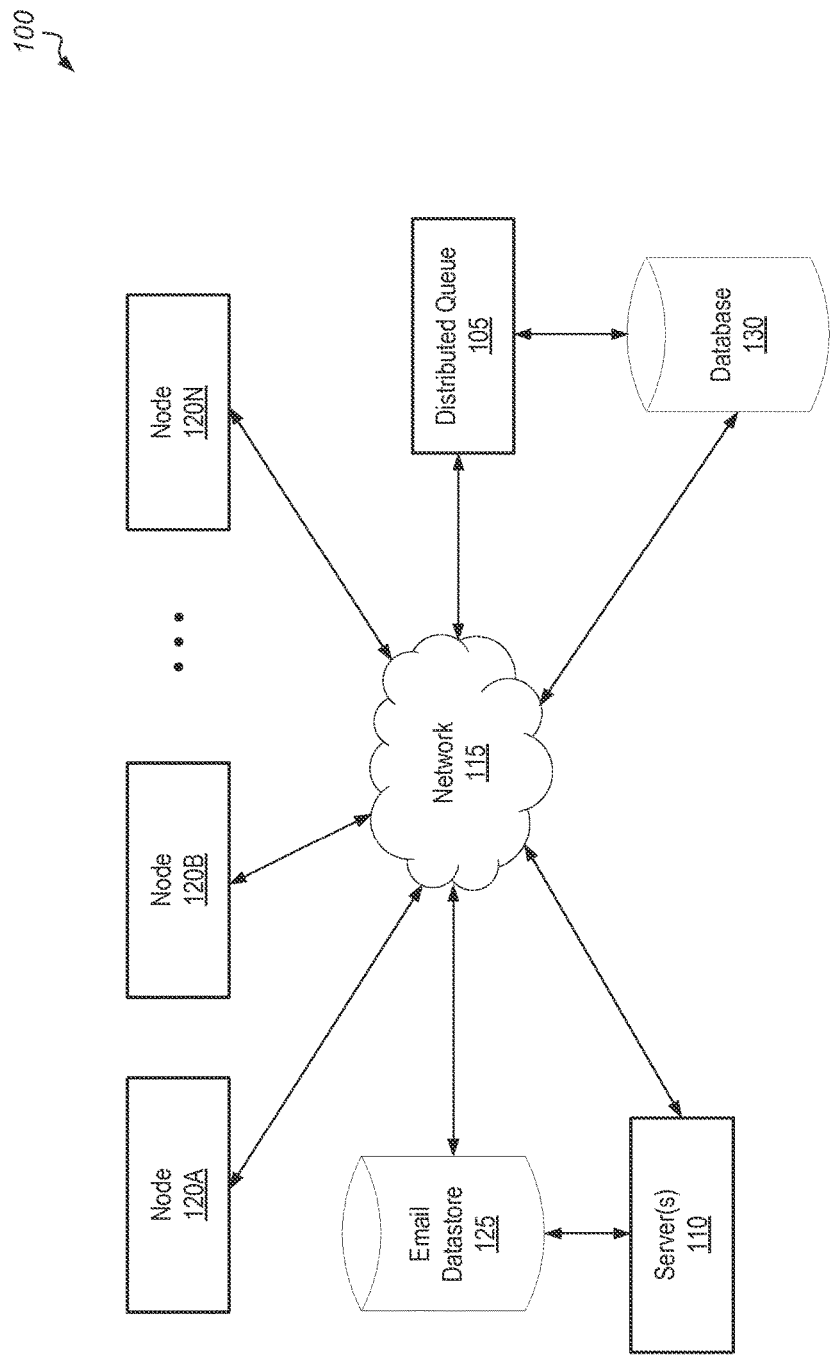
FIG. 1 is a block diagram of one embodiment of a system for reconstructing email threads.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising one or more nodes . . . ." Such a claim does not foreclose the system from including additional components (e.g., a display unit, a storage unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a system having eight nodes, the terms "first" and "second" nodes can be used to refer to any two of the eight nodes. In other words, the "first" and "second" nodes are not limited to logical nodes 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system 100 for reconstructing email threads is shown. The system includes one or more servers 110, email datastore 125, distributed queue 105, a scalable no-sql database 130, and a plurality of nodes 120A-N coupled to a network 115 such as a public network (e.g., the Internet, a wireless network) or a private network (e.g., LAN, storage area network (SAN), Intranet). Server(s) 110 is representative of any number and type (e.g., email server) of server. In one embodiment, database 130 may be utilized for storing data retrieved from email datastore 125. Email datastore 125 is intended to represent a plurality of emails (e.g., email corpus) stored in any of a variety of formats. New batches of emails may be added to email datastore 125 over time, or the new batches of emails may be forwarded directly to database 130.

Each of nodes 120A-N may include processing, memory/storage, and input/output (I/O) resources for reconstructing email threads for subjects picked up by the node from distributed queue 105. The nodes 120A-N may retrieve subjects from distributed queue 105 and process them until there are no subjects left in distributed queue 105. In one embodiment, there may be multiple processing threads on each node 120A-N and each processing thread may pick a subject from distributed queue 105. Accordingly, a given node may be processing multiple subjects simultaneously. However, the same subject will not be processed on multiple nodes.

In one embodiment, each node 120A-N may be configured to forward queries to database 130 for processing. In response to receiving a query from a given node 120, database 130 may respond with a plurality of emails which meet the criteria specified by the given node 120. For example, in one embodiment, the given node 120 may pick up a subject for email thread reconstruction from distributed queue 105. The given node 120 may provide the subject or subject hash to database 130, and database 130 may perform a search for the subject or subject hash and then return all of the emails to the given node 120 which are indexed for the subject or subject hash.

In various embodiments, data may be extracted from email datastore 125 and efficiently organized in database 130. In one embodiment, the email subject may be used as the primary key for storing data in database 130. In this embodiment, a relaxed checksum may be utilized as the secondary key for storing data in database 130, wherein the relaxed checksum is computed from one or more attributes of a given subject's emails. In another embodiment, a hash of the original email of the given subject may be utilized as the secondary key for storing emails in database 130. In a further embodiment, the date and time of the top level email of the given subject may be utilized as the secondary key for storing emails in database 130. It should be understood that while database 130 is shown as a single logical component in FIG. 1, database 130 may actually comprise several distributed components. Database 130 may be implemented using a scalable distributed storage system (e.g., Apache Cassandra) that is concurrently accessible and fault tolerant.

In one embodiment, emails may be grouped by a formatted subject hash partition. Then, different subject hashes may be distributed to different nodes of nodes 120A-N. Then, each node may pick up corresponding subject hashes for processing. Each node may retrieve, from database 130, all of the emails which are grouped by a given subject hash. Also, for each subject partition, each node may initially detect relationships between emails using the email header (e.g., request for comments (RFC) 2822) fields (e.g., message-ID, in-reply-to, references). If the email is not RFC 2822 compliant or the email is a contained email (i.e., exists as an older email within a more recent reply), then the node may detect relationships between emails using similarity hashes of email content.

In one embodiment, each node may determine the status of the discussion thread root of the email subject assigned to the node. If there is a missing message-ID or hash (i.e., an email refers to a message-ID or a hash, but the original email for that is not found in that subject), then the status of that thread may be marked as incomplete. If the parent message-ID or parent hash of an email is not available, then the node may conclude that the email is the root and the status of the thread is complete. If the node is able to find the email either by the parent message-ID or by the parent hash, then the status is complete. If the node is able to find the parent message-ID or the parent hash but an email in the partition could not be found, then the status is incomplete. Once all of the subjects have been processed on the different nodes, a central merge may be performed for incomplete discussion threads.

In one embodiment, emails may be grouped in database 130 by the formatted subject hash partition. Different subject hashes may be distributed to different nodes 120A-N. On each node 120, all of the emails which are grouped by the subject hash may be retrieved from database 130. When examining a given email, the node may determine if the email includes detectable header information (e.g., message-ID, in-reply-to, references). If the email includes detectable header information in a recognizable format then the node may detect relationships between emails using the header information. If the email does not include detectable header information, then the node may detect relationships between emails using contained mail hashes. In other embodiments, other suitable techniques for processing subjects on the individual nodes 120A-N may be utilized.

Although components of system 100 are shown connected to each other through network 115, it should be understood that this is shown merely for ease of representation. Some components may have direct connections to each other, or may be connected to each other via other links (e.g., backplanes, switch fabrics). Additionally, although only a single network 115 is shown, it should be understood that network 115 represents any number and type of networks which may be utilized for system 100.

Figure 2:
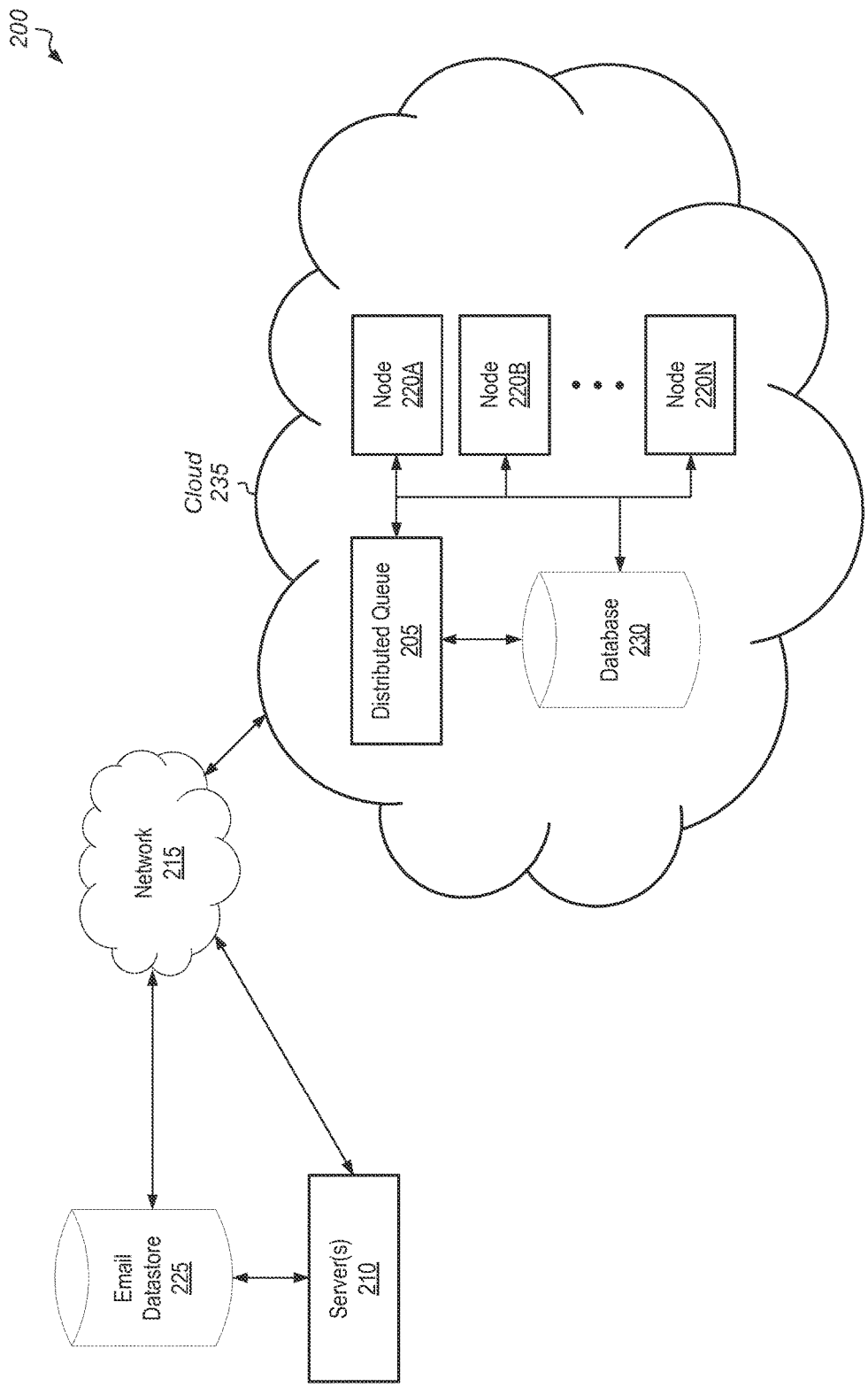
FIG. 2 is a block diagram of another embodiment of a system for reconstructing email threads.

Turning now to FIG. 2, a block diagram of another embodiment of a system 200 for reconstructing email threads is shown. The components shown in FIG. 2 may perform similar functions to the corresponding components shown in system 100 of FIG. 1. However, in system 200, the distributed queue 205, database 230, and nodes 220A-N are located in the cloud 235. It should be noted that any number of servers 210 and email datastores 225 associated with different organizations may be coupled to cloud 235 for utilizing the email thread reconstruction functions performed in cloud 235. Cloud 235 is representative of any number of instances of a cloud service running on any type of cloud infrastructure. In some embodiments, database 230 may be a multi-tenant database comprising data from multiple organizations.

Figure 3:
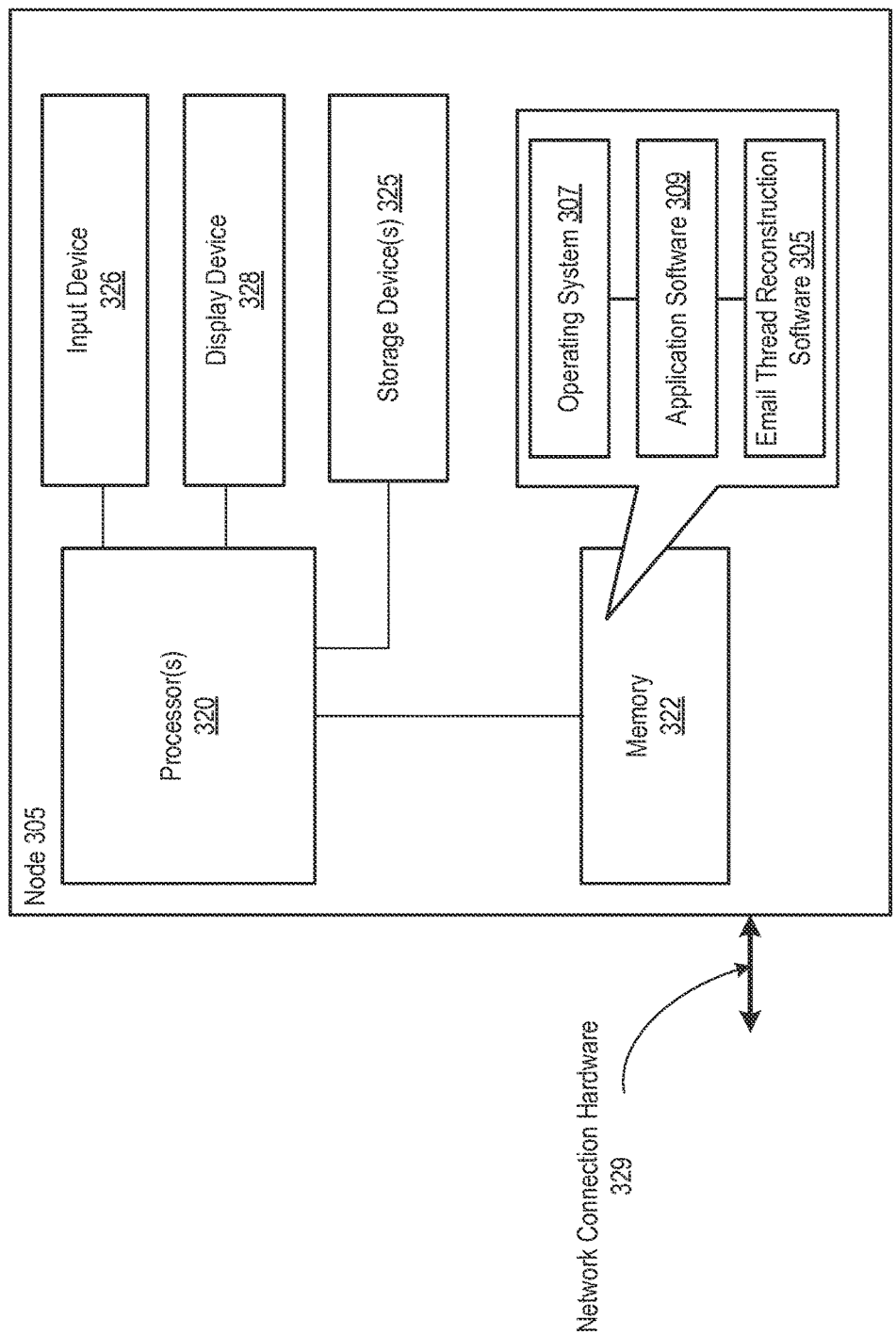
FIG. 3 illustrates a node in accordance with one embodiment.

Referring now to FIG. 3, a block diagram of one embodiment of a node 305 which may implement various embodiments of the methods described herein. The node 305 may include one or more processors 320 coupled to memory 322. In some embodiments, the memory 322 may include one or more forms of random access memory (RAM) such as dynamic RAM (DRAM) or synchronous DRAM (SDRAM). However, in other embodiments, the memory 322 may include any other type of memory instead or in addition. The memory 322 may store program instructions and/or data. In particular, the memory 322 may store operating system 307, application software 309, and email thread reconstruction software 305. The email thread reconstruction software 305 may execute to perform various functions described herein, including reconstructing email threads for subjects retrieved by the host node.

It is noted that the processor 320 is representative of any number and type of processor which may include multiple physical and/or logical cores. For example, in one embodiment, the processor 320 may be compatible with the x86 architecture, while in another embodiment, the processor 320 may be compatible with the SPARC™ family of processors. Also, in some embodiments the node 305 may include multiple processors 320. The node 305 also includes one or more storage devices 325. The storage device(s) 325 may store file system information which may include both the actual data for a plurality of files and metadata used to manage the files. In various embodiments, the storage devices 325 may include any of various kinds of storage devices. Examples of storage devices include disk storage units (e.g., devices including one or more disk drives), tape drives (e.g., devices operable to store data on tape cartridges), optical storage devices (e.g., devices operable to store data on optical media), magnetic storage units, flash memory storage devices, etc.

The node 305 may also include one or more input devices 326 for receiving input to the email thread reconstruction software 305 or other programs executing on the node 305. As one example, the email thread reconstruction software 305 may be operable to display a graphical user interface enabling an administrator to specify a group of email threads to be reconstructed. The input device(s) 326 may include any of various types of input devices, such as keyboards, keypads, microphones, or pointing devices (e.g., a mouse or trackball). The node 305 may also include one or more output devices 328 for displaying output (e.g., the graphical user interface of the email thread reconstruction software 305). The output device(s) 328 may include any of various types of output devices, such as LCD screens or monitors, CRT monitors, etc.

The node 305 may also include network connection hardware 329 through which the node 305 couples to one or more networks enabling communication with other nodes, computer systems, orchestration modules, databases, email datastores, etc. The network connection 329 may include any type of hardware for coupling the node 305 to a network, depending on the type of network. In various embodiments, the node 305 may be coupled to the other computer systems via any type of network or combination of networks. For example, the network may include any type or combination of local area network (LAN), a wide area network (WAN), an Intranet, the Internet, etc. Examples of local area networks include Ethernet networks, Fiber Distributed Data Interface (FDDI) networks, and token ring networks. Also, each computer may be coupled to the network using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

Turning now to FIG. 4, a block diagram illustrating one embodiment of an example email collection 400 and the corresponding email discussion 405 are shown. The email discussion 405 is shown at the bottom of FIG. 4, and this is intended to represent one example of an email discussion. The email E0 is the start of the discussion, and E0 is shown at the bottom of the email discussion 405 with the text body of "Please send the ppt". Next, email E1 with the text body of "Here is the PPT" is shown as a reply to E0. Finally, email E2 with the text body of "Thx" is shown as a reply to E1.

The formatting of replied emails may vary according to the email application being used. For example, in another embodiment, each line of E0 may have a double inequality sign ">>" at the beginning of the line. Also, in this embodiment, each line of E1 may have a single inequality sign ">" at the beginning of the line. Other types of formatting to denote the text of an earlier email and to distinguish it from the text of the reply may be utilized in other embodiments.

The email collection 400 for email discussion 405 is shown at the top of FIG. 4. The email collection 400 shows how emails may be arranged with a box representing each email, with E2 on top of E1, and E1 on top of E0. Also, to the right of the boxes is one example of terminology which may be used to describe the different emails in the email discussion 405. For example, E2 may be referred to as the top level email. E1 may be referred to as a derived email or a contained email since it is contained within E2. E0 may also be referred to as a derived email or a contained email since it is also contained within E2. Email E2 is the top level email, and the top level email may have attachments, while typically, the contained mail does not have attachments. The entire group of E2, E1, and E0 may be referred to as a "derived email group". In a typical email application, when a reply is generated, the time is expressed in the time zone of the sender. When an email is replied to, the contained email gets the time zone of the replier. Accordingly, there may be some time skew between the emails.

Turning now to FIG. 5, a block diagram illustrating one embodiment of another example email collection 500 and the corresponding original email discussion 505 are shown. The email discussion 505 is shown at the bottom of FIG. 5, and this is intended to represent another example of an email sequence which has been generated from the same emails E0 and E1 as shown in FIG. 4.

The email E0 is the start of the discussion, and E0 is shown at the bottom of the email discussion 505. Next, email E1 is shown as a reply to E0. Finally, email E3 is shown as a reply to E1. It is noted that E0 and E1 are the same as the E0 and E1 of email discussion 405 (of FIG. 4), with E3 being a different reply to E1 than the reply E2 to E1 shown in discussion 405. In other email discussions with more than two recipients, different recipients may reply to the same email, which will create diverging reply chains which come from the same root. However, these diverging reply chains may be considered as part of the same email thread. The email collection 500 for this email discussion 505 is shown at the top of FIG. 5. In email collection 500, E3 is the top level email, and E1 and E0 are contained emails.

Referring now to FIG. 6, a block diagram illustrating one embodiment of an email collection and corresponding expected discussion thread 620 is shown. One example of a set of emails that were retrieved during email collection is shown in columns 605, 610, and 615 on the left-side of FIG. 6. Each column of blocks on the left-side of FIG. 1 represents a different email which was collected for a search of a given subject. For example, the leftmost column 605 includes three boxes. First, an email E0 was sent, E1 was a reply to E0, and then E2 was a reply to E1. The next column 610 of boxes shows another email which was collected for the search of the given subject. In this column, the email E3 is shown as the top-most email, and E3 was a reply to E1, which was a reply to E0. The right-most column 615 includes the email E1 which was a reply to E0.

The boxes are arranged so that all of the E0's are aligned together and all of the E1's are aligned together. Although this example shows only three columns which were collected for this group, a typical search for a subject may result in the retrieval of thousands of emails. Typically, each time a person replies to an email, the original email is included in the reply. This redundant data results in large amounts of data being retrieved in email collections. The expected discussion thread 620 is shown on the right-side of FIG. 6, with E0 at the top of the tree, E1 below E0, and with E2 connected below E1 and E3 connected below E1.

Referring now to FIG. 7, a block diagram illustrating another example of an email collection and a corresponding email discussion thread are shown. The email collection shows two columns 705 and 710 collected for the corresponding subject. Column 705 includes a reply E2 to contained email E1 and contained email E1. Each of the subjects (S0) remains the same for each of these emails, as shown with the "S0" next to the identification of the email. Therefore, for email collection column 705, each of the replies has the same subject as the prior emails.

Next, email collection column 710 is also shown, and the reply E3 has a different subject "S3" than the earlier emails E1 and E0 which have the subject "S0". For email collection column 710, E3 is a reply to the email E1. The node which is responsible for reconstruction of the thread 715 may be configured to detect the change of subject from "S0" to "S3" and to reconstruct thread 715 by placing email E3 at the bottom of the tree. As shown in reconstructed thread 715, email E1 is a parent to both E2 and E3, with E2 being a first child of E1 and E3 being a second child of E1. Any emails which come after E2 and E3 may be added to the tree in similar fashion.

Turning now to FIG. 8, a block diagram illustrating another example of an email collection and a corresponding email discussion thread 815 are shown. Email collection 805 includes four emails including a top-level email E3 which is a reply to E2, E2 which is a reply to E1, and E1 which is a reply to E0. Email collection 810 includes four emails including a top-level email E5 which is a reply to E3, E3 which is a reply to E2, and E2 which is a reply to E0. E1 was deleted from the reply chain for email collection 810, and so E2 is shown as the reply to E0.

The expected discussion thread 815 for email collections 805 and 810 is shown on the right-side of FIG. 8. Thread 815 includes E0 as the original email, with E1 a child of E0, E2 a child of E1, E3 a child of E2, and E5 a child of E3. The example of FIG. 8 is intended to show the case when an email is deleted from a reply chain, and the corresponding discussion thread for such a case.

Figure 9:
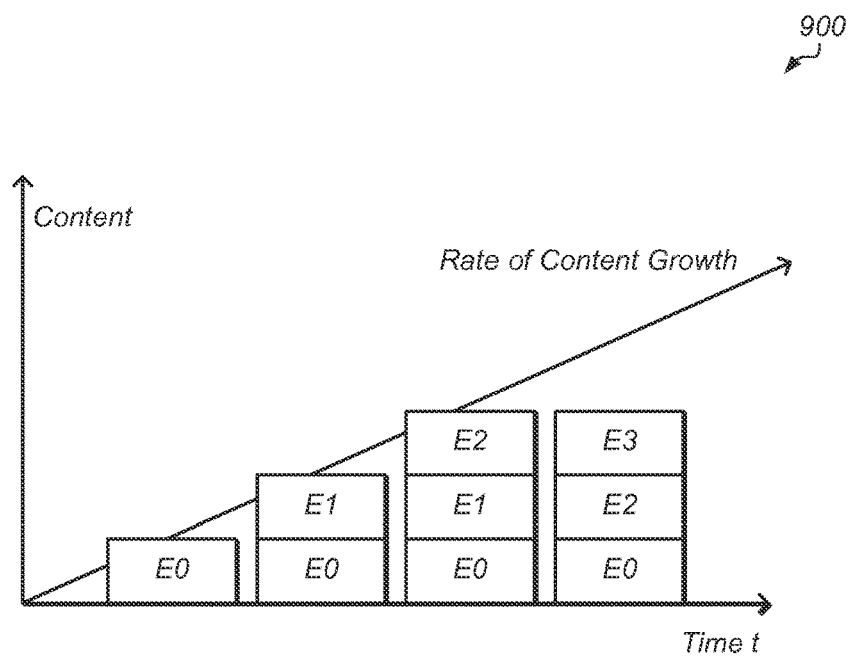
FIG. 9 illustrates the way data is organized to form discussion threads, based on Top Level Email's subject as primary key and sent time of top level email as secondary key.

Referring now to FIG. 9, an illustration 900 of the way data is organized to form discussion threads based on the top level email's subject as a primary key and the sent time of the top level email as a secondary key is shown. By organizing data in the manner shown in illustration 900, nodes are more likely to correct for the cases where there are missing emails. For example, E2 is a reply to E1, but in E3, which is the next reply to E2, E1 has been deleted. By ordering data as shown in illustration 900, nodes are likely to obtain the correct email containment.

Illustration 900 also illustrates the explosion of data due to redundant emails within discussion threads, which causes the amount of data to increase rapidly as the length of an email reply chain grows. The original email E0 will most likely appear in all of the subsequent emails. Similarly, email E1 (a reply to E0) will also likely appear in all of the emails that come after it in the email discussion. Typically, whatever is contained will appear in an email as new replies are generated in the discussion. It should be noted that it is not always straightforward to deduplicate all of the E0's in later emails only using text comparisons because when someone replies to E0 or a later email in the chain, part of E0 may be modified or deleted. Also, the time associated with email E0 might be different based on the replier's time zone.

Figure 10:
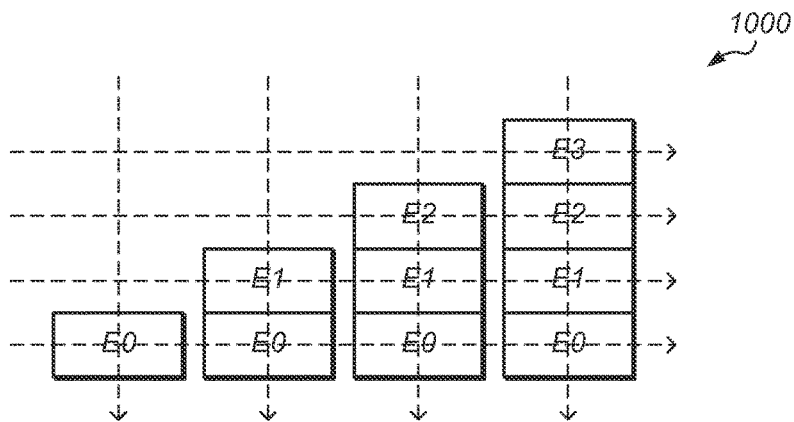
FIG. 10 illustrates the way data is organized to remove redundant emails, based on subject of the email as primary key and its relaxed checksum as secondary key.

Turning now to FIG. 10, an illustration 1000 of the way data is organized to remove redundant emails based on the subject of the email as a primary key and its relaxed checksum as a secondary key is shown. On the right side of illustration 1000, the email E3 is shown which contains emails E2, E1, and E0. When the database receives or extracts email E3, the database will detect what looks like other emails inside email E3. Accordingly, the database may parse E3 and break it into four emails. The database may utilize a relaxed checksum, which is relaxed based on one or more elements within an email. For example, the relaxed checksum may be relaxed in terms of the time zone (which might change), and the database may organize the emails based on the relaxed checksum so that all of the duplicate emails are arranged together. In one embodiment, the relaxed checksum may remove one or more fields, such as the time which may change due to time zone discrepancies. The relaxed checksum may also remove any prefixes (e.g., "FW", "RE") from the subject. The relaxed checksum may also utilize the body of the email and the "from", "to", and "cc" fields of the email. In one embodiment, the relaxed checksum may be a hash of the formatted subject (after removing FWD, RE, etc.), the sender ID, the receiver IDs, and the text content. In this embodiment, the relaxed checksum does not include the sent date, since the sent data can be changed based on the time zone.

Each of the boxes 1005, 1010, and 1015 illustrates a different example of formatting which may be used by various email application clients. In one embodiment, the derived email parser may be configured to demarcate the derived email in the body of email E3 based on the different types of formatting used such as those shown in boxes 1005, 1010, and 1015. The derived email parser may use well known demarcation blocks (top-posting or bottom-posting) or inline or quoted text to extract out derived emails. The ">>" and ">" type of demarcation may be used in the case of quoted emails or emails which have an inline reply. An example of an inline reply is shown in box 1025 which is a reply to the email shown in box 1020.

In some embodiments, a similarity checksum may be utilized to detect the same contained email in different top-level emails when the content in one of the contained emails has changed. The similarity checksum may break an email into portions (e.g., breaking sentences into groups of words (or trigrams)), and then the database may determine the frequency of different trigrams in each of the emails. This takes advantage of the property that two emails which are similar are likely to have a large number of the same trigrams appear in both emails. The database may then organize groups of emails together based on the frequency of trigrams which appear in the groups.

Illustration 1000 is intended to show a pictorial representation of how data is stored in a given database. The boxes are arranged in illustration 1000 so that all of the E0's are aligned together horizontally, all of the E1's are aligned together horizontally, and so on. The horizontal line connecting all of the E0's indicates this alignment and how the emails are stored which allows for the database and/or nodes to deduplicate the redundant E0's and keep the authoritative E0 (i.e., the left-most E0). Accordingly, within the corresponding subject, all of the E0's may be stored together, all of the E1's may be stored together, and so on, as represented by illustration 1000. After the data is organized in the database, the database may then deduplicate the redundant email content. Alternatively, a node may deduplicate the redundant emails in memory after the node loads the emails for a given subject assigned to the node.

The node may be able to determine that the left-most E0 should be identified as the authoritative email since it is the earliest E0 of the E0's with the horizontal line passing through them. Once the authoritative email for a group is found, the other redundant emails may be discarded. In one embodiment, each E0 may be stored in a database row, and a column may be added to each row to identify which E0 is the authoritative E0. Accordingly, all of the other E0's may point to the authoritative E0. The database which is utilized to store the emails may be organized so that given a subject, the database will be able to retrieve all of the rows efficiently and quickly.

The vertical lines in illustration 1000 show that emails may be clustered by the top level email's subject hash and sorted in ascending order of sent date. The sorting of the sent date may be performed by the database itself while storing the emails, which is helpful for threading. The horizontal lines show emails may be clustered by the subject hash of the email itself and the relaxed checksum, which is helpful for deduplication or removing redundant emails.

Referring now to FIG. 11, an illustration 1100 of time zone skew when an email is replied to in another time zone is shown. Illustration 1100 is intended to show the differences in time which may be assigned to an email due to different repliers being in different time zones. The original email E0 may be sent from India at 10 am on the 1 Jan. 2015 in India Standard Time (IST). The email E0 may be sent to multiple recipients in different locations around the world. Then, someone in Japan may generate a reply E1 to the email E0, and then email E0 may get tagged with the time of 1:30 pm on the 1 Jan. 2015 in Japan Standard Time (JST). Also, someone in the United States may generate a reply E2 to the email E0, and then email E0 may get tagged with the time of 11:30 pm on 31 Dec. 2014 in Pacific Standard Time (PST). Other recipients of email E0 may also reply to E0 in other time zones around the world.

The database may account for the differences in time zones for different repliers by using a relaxed checksum for replies which factors in differences in time. Accordingly, a change in time will not prevent the database from recognizing that the three emails E0 are the same, even though they may have different timestamps.

Figure 12:
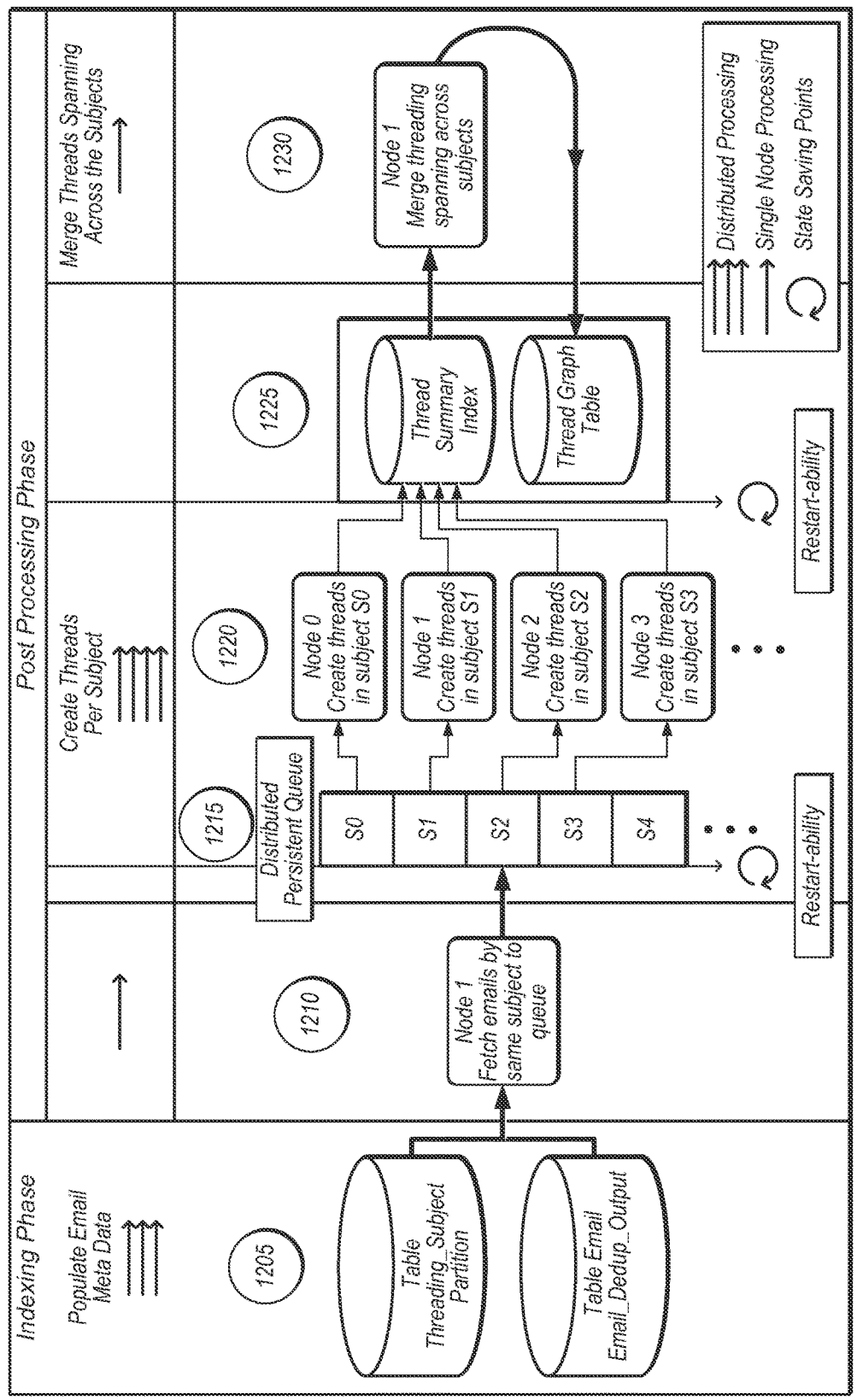
FIG. 12 is a diagram of one embodiment of a scalable distributed email threading algorithm.

Turning now to FIG. 12, a diagram of one embodiment of a scalable distributed email threading algorithm is shown. Block 1205 illustrates the indexing phase of the algorithm, when batches of emails or an email corpus are processed and one or more databases are built from the emails. The database(s) may be organized to allow for efficient searches of emails by their subjects or subject hashes. Block 1210 illustrates the first step of the post processing phase when emails are fetched by the same subject and stored in a distributed persistent queue.

Block 1215 illustrates different subjects being conveyed to different nodes for processing. Block 1220 illustrates each node reconstructing a thread from the subject assigned to the node. Any number of nodes may be utilized, depending on the embodiment. Next, in block 1225, the reconstructed threads may be written back to the database(s). It is noted that blocks 1215 and 1225 are state saving points which may have the ability to be restarted at a later point in time. Next, in block 1230, one or more nodes may merge threads spanning more than one subject, and then the merged threads may be written back to the database(s). In another embodiment, merged threads may be written back to a thread index, which is another datastore more optimized for thread searches.

It is noted that if emails are added incrementally, irrespective of chronological order (e.g., an original email may actually come in later batches), the already threaded corpus does not have to be reprocessed. The threading of an incremental batch will update only the affected threads instead of causing threading to be implemented all over again.

Figure 13:
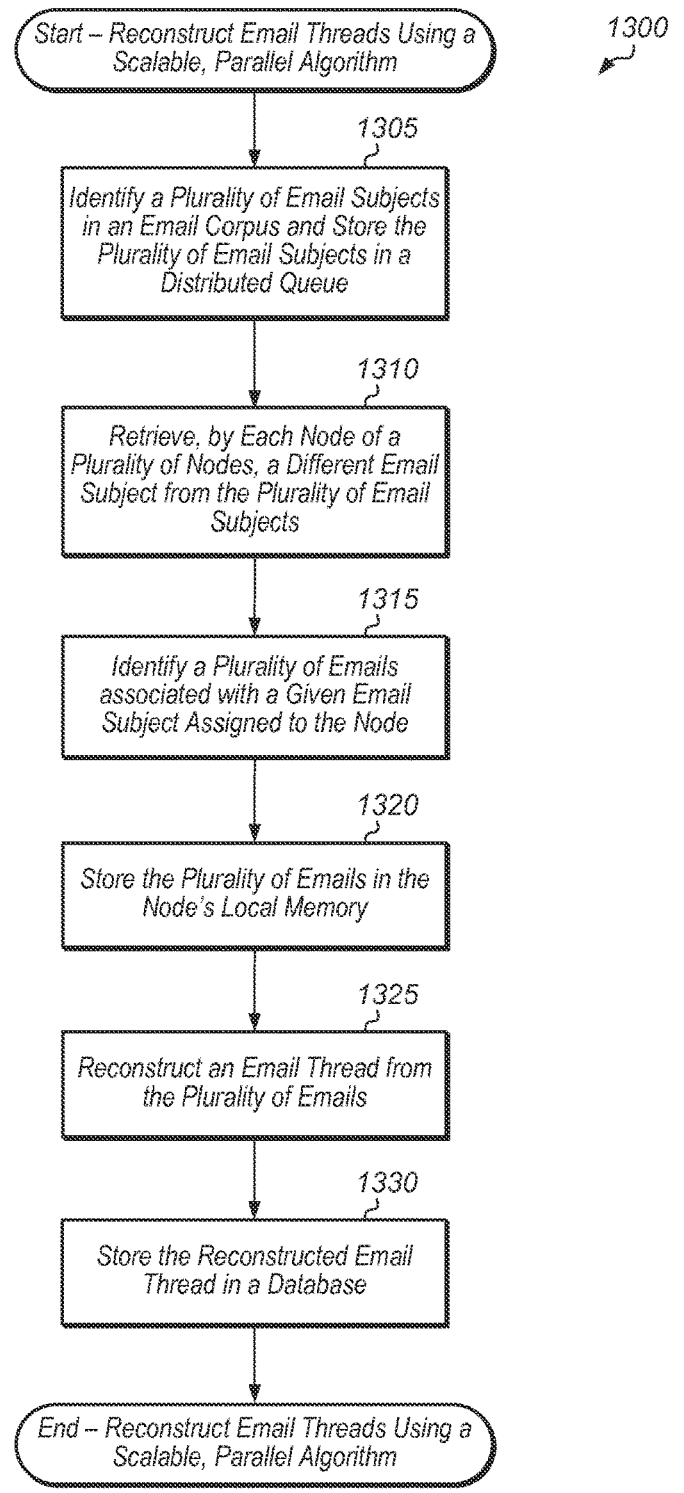
FIG. 13 is a generalized flow diagram illustrating one embodiment of a method for reconstructing email threads using a scalable, parallel algorithm.

Turning now to FIG. 13, one embodiment of a method 1300 for reconstructing email threads using a scalable, parallel algorithm is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 1300.

A plurality of email subjects may be identified in an email corpus and stored in a distributed queue (block 1305). In one embodiment, only distinct subjects from the email corpus may be queued in the distributed queue, with the hash of the email subject being used as the queue item. The distinct subject hash may be maintained using data store capability, like for example using a primary key in a relational database management system (RDBMS). For a derived email, the hash may be calculated after formatting the subject (i.e., after removing the standard prefixes like RE: or FW:). Each node of a plurality of nodes may retrieve a different email subject from the plurality of email subjects (block 1310). Each node may then identify a plurality of emails associated with a given email subject retrieved by the node (block 1315). In one embodiment, each node may search a database for all emails associated with the given email subject. In various embodiments, the database may be utilized for storing emails retrieved from the email corpus. The node may then store the plurality of emails in the node's local memory (block 1320). The node may then reconstruct an email thread from the plurality of emails (block 1325). In one embodiment, the node may utilize an in-memory algorithm to reconstruct the email thread. For example, for the email collection columns 605, 610, and 615 illustrated in FIG. 6, an in-memory tree may be formed, and since E0 is identified as coming first, E0 may be a node of the tree. Since E1 was a reply to E0, E1 may be added as a child, and so on.

After block 1325, the reconstructed email thread may be stored in a database (e.g., scalable NoSQL database) (block 1330). It is noted that blocks 1315-1330 may be performed in parallel on the plurality of nodes. It is also noted that each node may include a plurality of processing threads, and each processing thread may retrieve a given email subject for processing, such that a given node may be processing multiple subjects simultaneously. After block 1330, method 1300 may end.

Figure 14:
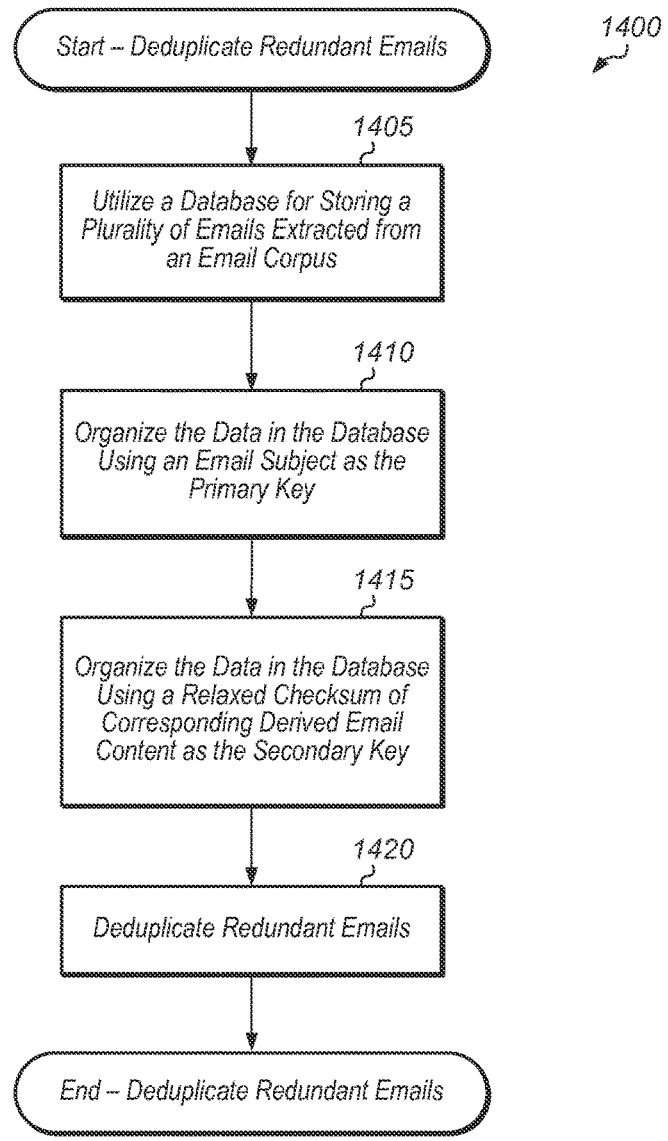
FIG. 14 is a generalized flow diagram illustrating one embodiment of a method for deduplicating redundant emails.

Turning now to FIG. 14, one embodiment of a method 1400 for deduplicating redundant emails is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 1400.

A database may be utilized for storing a plurality of emails extracted from an email corpus (block 1405). The data may be organized in the database using an email subject (or hash of the email subject) as the primary key (block 1410). In one embodiment, the data may be organized in the database using a relaxed checksum of corresponding derived email content as a secondary key (block 1415). It is noted that this way of organizing the database may be utilized in order to eliminate redundancy. In another embodiment, the data may be organized in the database using a hash of a corresponding original email as a secondary key. In other embodiments, the data may be organized in the database utilizing other secondary keys.

Next, redundant emails may be deduplicated by the database (block 1420). In one embodiment, for deduplicating two top level emails, a strict checksums of the attributes used for the relaxed checksum plus the sent data may be utilized. For deduplicating top level emails with derived or contained email, in one embodiment, it may be determined if the emails have the same relaxed checksum and that the timestamps of the emails are within two minutes of each other. In another embodiment, it may be determined if the emails have the same relaxed checksum and that the timestamps are a maximum of 24 hours apart and have a time modulo of 30 minutes with a relaxation of ±2 minutes. In a further embodiment, it may be determined if the emails have a similarity vector match above a threshold and that the timestamps of the emails are within two minutes of each other. In a still further embodiment, it may be determined if the emails have a similarity vector match above a threshold and that the timestamps are a maximum of 24 hours apart and have a time modulo of 30 minutes with a relaxation of ±2 minutes. After block 1420, method 1400 may end.

Figure 15:
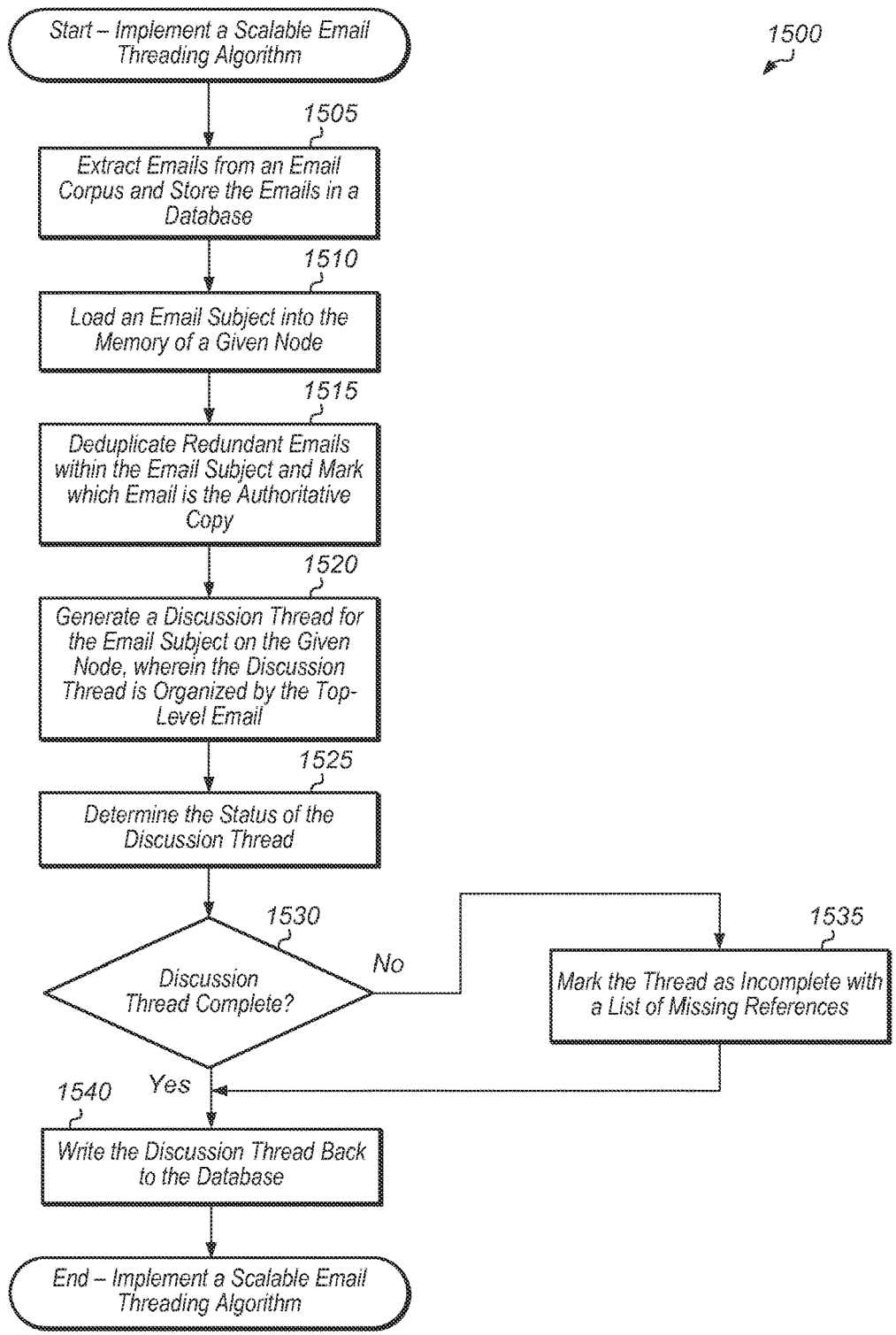
FIG. 15 is a generalized flow diagram illustrating one embodiment of a method for implementing a scalable email threading algorithm.

Referring now to FIG. 15, one embodiment of a method 1500 for implementing a scalable email threading algorithm is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 1500.

Emails may be extracted from an email corpus and stored in a database (block 1505). Next, an email subject may be loaded into the memory of a given node (block 1510). Then, the redundant emails within the email subject may be deduplicated and the email which is the authoritative copy for each group of redundant emails may be marked (block 1515). Block 1515 may be performed in-memory on the given node and on the database. Next, a discussion thread for the email subject may be generated on the given node, wherein the discussion thread is organized by the date of the top-level email (block 1520).

Next, the given node may determine the status of the discussion thread (block 1525). If the discussion thread is complete (conditional block 1530, "yes" leg), then the node may write the discussion thread back to the database (block 1540). If the discussion thread is incomplete (conditional block 1530, "no" leg), then the node may mark the thread as incomplete with a list of missing references (block 1535). In one embodiment, merging of incomplete threads may be implemented as a separate phase after all threads have been formed. In various embodiments, an orchestration module may be utilized to orchestrate the different phases of the email thread reconstruction process. After block 1535, the node may write the discussion thread back to the database (block 1540). After block 1540, method 1500 may end. It is noted that blocks 1510-1540 may be performed in parallel on a plurality of nodes.

Figure 16:
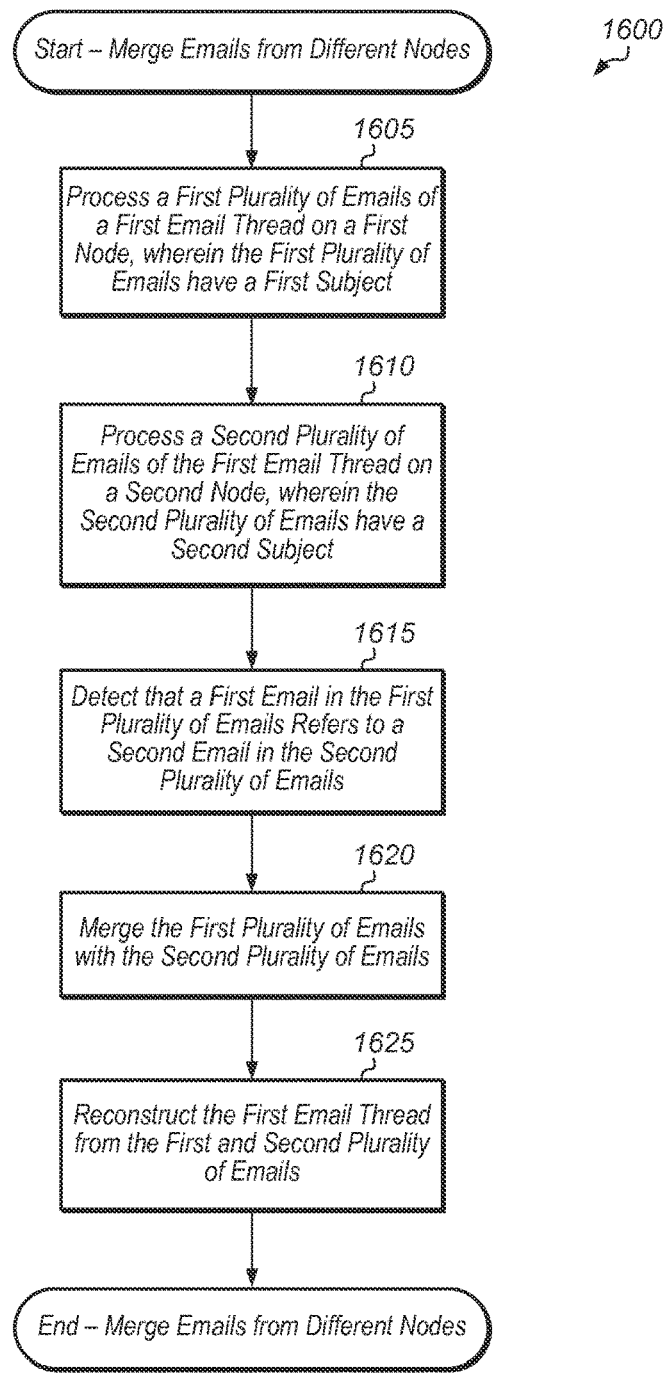
FIG. 16 is a generalized flow diagram illustrating one embodiment of a method for merging emails from different nodes.

Turning now to FIG. 16, one embodiment of a method 1600 for merging emails from different nodes is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 1600.

A first plurality of emails of a first email thread may be processed on a first node, wherein the first plurality of emails have a first subject (block 1605). A second plurality of emails of the first email thread may be processed on a second node, wherein the second plurality of emails have a second subject (block 1610). It may be assumed for the purposes of this discussion that the second subject is different from the first subject. It is noted that blocks 1605 and 1610 may be performed prior to the first email thread being reconstructed. Next, the first node may detect that a first email in the first plurality of emails refers to a second email in the second plurality of emails (block 1615). In response to detecting that the first email in the first plurality refers to the second email in the second plurality, the first node may merge the first plurality of emails with the second plurality of emails (block 1620). Next, the first email thread may be reconstructed from the merged first and second plurality of emails (block 1625). It is noted that blocks 1620 and 1625 may be performed in a merging phase, wherein the merging phase is implemented after a threading phase. After block 1625, method 1600 may end.

Figure 17:
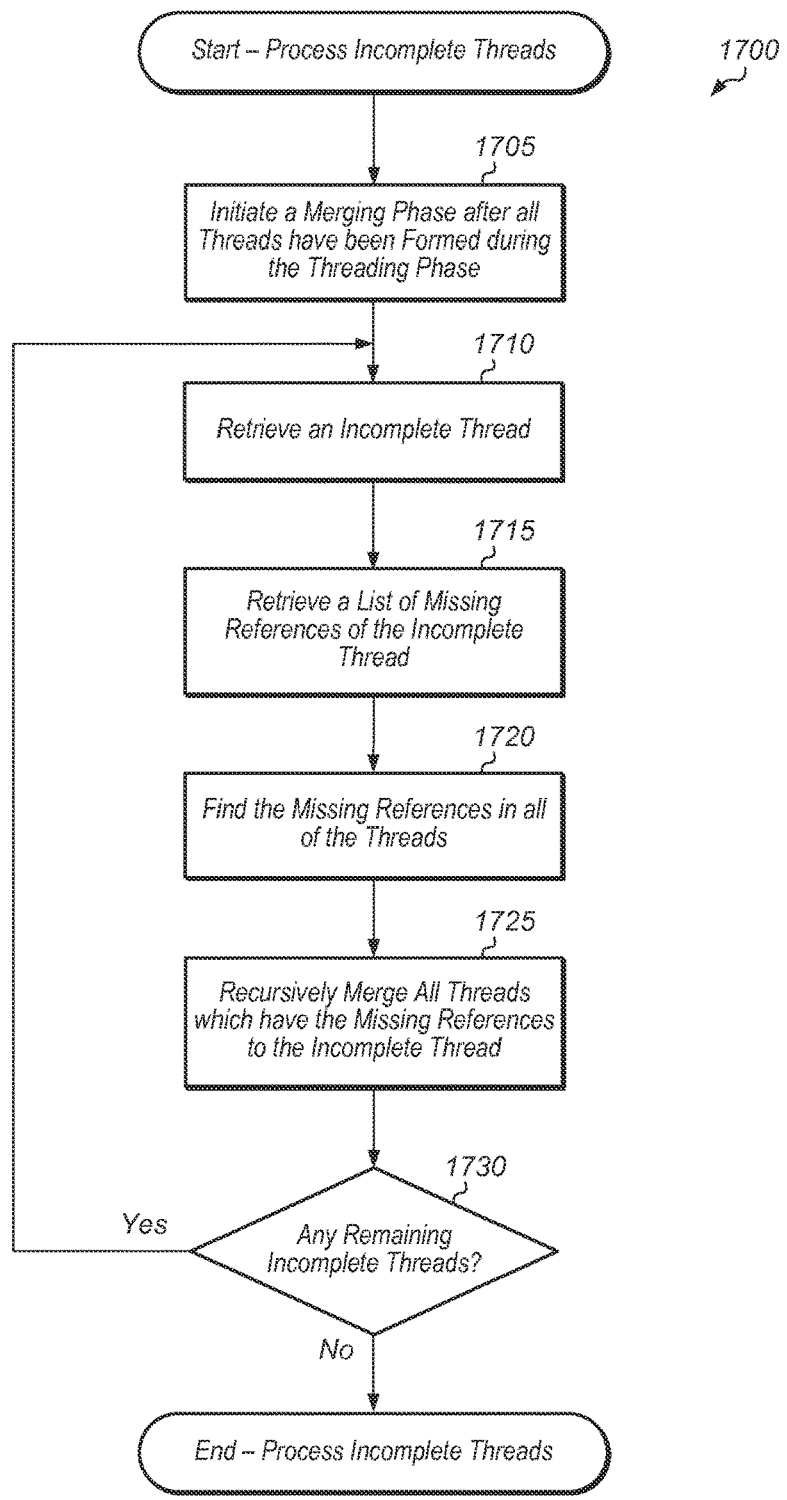
FIG. 17 is a generalized flow diagram illustrating one embodiment of a method for processing incomplete threads.

Referring now to FIG. 17, one embodiment of a method 1700 for processing incomplete threads is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 1700.

A merging phase may be initiated after all threads have been formed during the threading phase (block 1705). It may be assumed for the purposes of this discussion that there is at least one incomplete thread after the threading phase has been completed. In one embodiment, an orchestration module may orchestrate the different phases of the threading process. In one embodiment, method 1700 may be implemented on a single node after all threads have been formed.

Next, a given node may retrieve an incomplete thread (block 1710). The given node may retrieve a list of missing references of the incomplete thread (block 1715). Next, the given node may find the missing references in all of the threads (block 1720). Then, the given node may recursively merge all threads which have the missing references to the incomplete thread (block 1725). Next, the given node may determine if there are any other incomplete threads (conditional block 1730). If there are any other incomplete threads (conditional block 1730, "yes" leg), then method 1700 may return to block 1710 and the given node may retrieve the next incomplete thread. If there are no other incomplete threads (conditional block 1730, "no" leg), then method 1700 may end.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
   identifying, by a computing device, a plurality of email subjects in an email corpus stored on a storage device;
   performing on each computing node of a plurality of nodes, each of said nodes including one or more processors coupled to a memory:
   retrieving a given email subject from the plurality of email subjects, wherein the given email subject is only retrieved by a single node;
   identifying a plurality of emails which are associated with the given email subject;
   storing, on the node, a plurality of emails associated with the given email subject; and
   reconstructing one or more email threads from the plurality of emails by determining relationships between the plurality of emails based at least in part on:
   header information responsive to determining the header information is in a given format; and
   content of the plurality of emails responsive to determining the header information is not in the given format; and
   conveying the reconstructed one or more email threads to a database for storage.

2. The method as recited in claim 1, further comprising utilizing a distributed queue accessible by each of the plurality of nodes for storing the plurality of email subjects, and wherein each of the plurality of nodes are configured to perform said retrieving, storing, and reconstructing in parallel.

3. The method as recited in claim 1, further comprising organizing a database using an email subject as a primary key and a relaxed hash of derived email content as a secondary key.

4. The method as recited in claim 1, further comprising:
   determining a status of an email thread is incomplete prior to conveying the email thread to the database responsive to determining a message identifier in the email thread references an email that is not found in the a plurality of emails associated with the given email subject; and
   marking the email thread as incomplete with a list of message identifiers with missing emails responsive to determining the status is incomplete.

5. The method as recited in claim 4, further comprising:
   identifying, on a first node, a first email thread as an incomplete email thread;
   identifying, on a second node, a second email thread as an incomplete email thread; and
   merging the first email thread and the second email thread responsive to determining that a first email of the first email thread references a second email of the second email thread.

6. The method as recited in claim 5, wherein the first email thread is associated with a first email subject, and wherein the second email thread is associated with a second email subject.

7. The method as recited in claim 1, further comprising:
   receiving an incremental batch of emails; and
   threading the incremental batch of emails by forming threads from the batch of emails, wherein threading the incremental batch of emails only updates threads related to emails in the incremental batch of emails.

8. A system comprising:
   a database; and
   a plurality of computing nodes, each of said nodes including one or more processors coupled to a memory;
   wherein each node of the plurality of nodes is configured to:
   retrieve a given email subject from a plurality of email subjects, wherein the given email subject is only retrieved by a single node;
   store, on the node, a plurality of emails associated with a corresponding email subject, wherein the plurality of emails are retrieved from the database; and
   reconstruct one or more email threads from the plurality of emails by determining relationships between the plurality of emails based at least in part on:
   header information responsive to determining the header information is in a given format; and
   content of the plurality of emails responsive to determining the header information is not in the given format; and
   convey the reconstructed one or more email threads to a database for storage.

9. The system as recited in claim 8, wherein each of the plurality of nodes are configured to perform said retrieving, storing, and reconstructing in parallel.

10. The system as recited in claim 9, wherein the database is configured to use an email subject as a primary key and a relaxed hash of derived email content as a secondary key.

11. The system as recited in claim 9, wherein determining the relationships between the plurality of emails further comprises removing a sent date from the header information.

12. The system as recited in claim 8, wherein a first node of the plurality of nodes is configured to identify a first email thread as an incomplete email thread, wherein a second node of the plurality of nodes is configured to identify a second email thread as an incomplete email thread, and wherein the first node is further configured to merge the first email thread and the second email thread responsive to determining that the first email of the first email thread references the second email of the second email thread.

13. The system as recited in claim 12, wherein the first email thread is associated with a first email subject, and wherein the second email thread is associated with a second email subject.

14. The system as recited in claim 8, wherein the system is further configured to:
  receive an incremental batch of emails; and
  thread the incremental batch of emails by forming threads from the batch of emails, wherein threading the incremental batch of emails only updates threads related to emails in the incremental batch of emails.

15. A non-transitory computer readable storage medium storing program instructions, wherein the program instructions are executable by a processor to:
  identify a plurality of email subjects in an email corpus stored on a storage device;
  perform on each computing node of a plurality of nodes, each of said nodes including one or more processors coupled to a memory:
    retrieve a given email subject from the plurality of email subjects, wherein the given email subject is only retrieved by a single node;
    identify a plurality of emails which are associated with the given email subject;
    store, on the node, a plurality of emails associated with the given email subject; and
    reconstruct one or more email threads from the plurality of emails by determining relationships between the plurality of emails based at least in part on:
      header information responsive to determining the header information is in a given format; and
      content of the plurality of emails responsive to determining the header information is not in the given format; and
    convey the reconstructed one or more email threads to a database for storage.

16. The non-transitory computer readable storage medium as recited in claim 15, wherein the program instructions are further executable by a processor to utilize a distributed queue accessible by each of the plurality of nodes for storing the plurality of email subjects, and wherein each of the plurality of nodes are configured to perform said retrieving, storing, and reconstructing in parallel.

17. The non-transitory computer readable storage medium as recited in claim 15, wherein the program instructions are further executable by a processor to organize a database using an email subject as a primary key and a relaxed hash of derived email content as a secondary key.

18. The non-transitory computer readable storage medium as recited in claim 15, wherein the program instructions are further executable by a processor to:
  determine a status of an email thread is incomplete prior to conveying the email thread to the database responsive to determining a message identifier in the email thread references an email that is not found in the a plurality of emails associated with the given email subject; and
  mark the email thread as incomplete with a list of message identifiers with missing emails responsive to determining the status is incomplete.

19. The non-transitory computer readable storage medium as recited in claim 18, wherein the program instructions are further executable by a processor to:
  identify, on a first node, a first email thread as an incomplete email thread;
  identify, on a second node, a second email thread as an incomplete email thread; and
  merge the first email thread and the second email thread responsive to determining that a first email of the first email thread references a second email of the second email thread.

20. The non-transitory computer readable storage medium as recited in claim 19, wherein the first email thread is associated with a first email subject, and wherein the second email thread is associated with a second email subject.

* * * * *